United States Patent
Yearsley

(10) Patent No.: US 8,627,116 B2
(45) Date of Patent: Jan. 7, 2014

(54) POWER CONSERVATION IN AN INTRUSION DETECTION SYSTEM

(75) Inventor: Gyle D Yearsley, Boise, ID (US)

(73) Assignee: Maxim Integrated Products, Inc., San Jose, CA (US)

( * ) Notice: Subject to any disclaimer, the term of this patent is extended or adjusted under 35 U.S.C. 154(b) by 1633 days.

(21) Appl. No.: 11/890,672

(22) Filed: Aug. 7, 2007

(65) Prior Publication Data

US 2009/0040063 A1 Feb. 12, 2009

(51) Int. Cl.
*G06F 1/00* (2006.01)
*G06F 1/32* (2006.01)

(52) U.S. Cl.
USPC .............. 713/300; 713/320; 713/323; 726/23

(58) Field of Classification Search
USPC ................... 713/300, 320, 323; 726/23
See application file for complete search history.

(56) References Cited

U.S. PATENT DOCUMENTS

| | | | | |
|---|---|---|---|---|
| 4,851,987 | A | 7/1989 | Day | 364/200 |
| 4,999,794 | A | 3/1991 | Yakushiji | 364/707 |
| 5,142,684 | A | 8/1992 | Perry et al. | 395/750 |
| 6,607,137 | B2 * | 8/2003 | Morales | 235/492 |
| 6,868,362 | B1 * | 3/2005 | Oda et al. | 702/158 |
| 6,941,481 | B2 | 9/2005 | Oshima et al. | 713/324 |
| 2005/0182961 | A1 * | 8/2005 | Timmermans et al. | 713/200 |
| 2008/0025525 | A1 * | 1/2008 | Tsai | 381/74 |

OTHER PUBLICATIONS

Code segment commercially available Nov. 2005, 2 pages.

* cited by examiner

*Primary Examiner* — Paul Yanchus, III
*Assistant Examiner* — Michael J Brown
(74) *Attorney, Agent, or Firm* — North, Weber & Baugh LLP

(57) ABSTRACT

In a tamper detection system, a control system controls power consumption by sensors and power consumption of a state machine that controls operations of the sensors. A first state machine controls which sensor is activated. A second state machine controls the operations performed by the activated sensor and the operations are timed according to a clock signal. Prior to activating a sensor, the second state machine is in a wait state. The clock signal is gated so that the logic state of the clock signal does not change when the second state machine is in a wait state. Power consumption by the state machine is reduced by gating the clock signal so that the clock signal is held to a fixed value. Immediately after the activated sensor performs all operations, the second state machine samples the pass or fail result from the sensor. Power consumption by the activated sensor is reduced by sampling the pass or fail result of the sensor immediately after the sensor performs the last operation and immediately turning off the sensor after sampling the pass or fail result. The second state machine enters another wait state after sampling of the pass or fail result.

23 Claims, 4 Drawing Sheets

POINT OF SALE TERMINAL

US 8,627,116 B2

POWER CONSERVATION IN AN INTRUSION DETECTION SYSTEM

CROSS REFERENCE TO COMPACT DISC APPENDIX

The Compact Disc, which is a part of the present disclosure, includes a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

TECHNICAL FIELD

The present invention relates to techniques for reducing power consumption of a tamper sensing system.

BACKGROUND

Point of sale (POS) terminals allow customers to make payments using a variety of payment instruments such as credit cards, debit cards, smart cards, and ATM cards. To ensure that the payment information transmitted from the POS terminals to a payment center is not accessed by unauthorized recipients, this information is typically encrypted and secured (e.g., using digital authentication) during transmission. However, confidential payment information entered by the user into the POS terminal could still be intercepted by tampering with the integrated circuits of the POS terminal. Thieves can use such information to fraudulently receive payment.

POS terminals have a battery backup to maintain storage of confidential information when the power is off. Battery life is an important factor to the life of a POS terminal in the field. To extend battery life, low current consumption from the battery is desirable when the battery powers the POS terminal. Sensors consume current from the battery when sensors are turned on. POS terminals use sensors to detect whether tampering with the POS terminal has taken place. It is desirable to minimize the amount of power consumed by the sensors and systems that control and monitor sensor operations.

SUMMARY

Power consumption of a system that detects potential tampering with a POS terminal is reduced in part by fixing a received clock to a fixed value and having a sampling operation of pass/fail indication from a selected sensor immediately following a last operation of the selected sensor. A first state machine selects a sensor to be activated. A second state machine controls whether the selected sensor consumes power and the operation performed by the selected sensor. The second state machine receives a clock signal. When the second state machine is in a wait state for a next sensor and the first state machine has not selected the next sensor, the received clock signal is held at a fixed value. In response to the first state machine selecting the next sensor, the second state machine controls the received clock signal to toggle between logic high and low values and the second state machine allows the activated sensor to consume power. Immediately after the activated sensor has completed all operations, the second state machine samples the pass/fail result from the sensor. After sampling the pass/fail result, the second state machine enters a wait state for a next sensor and controls the selected sensor to stop consuming power and also fixes the received clock signal to a fixed value.

Power consumption by the state machine is reduced when the second state machine does not receive an oscillating clock signal. Power consumption by the sensor is reduced by having no delay between a final operation of the sensor and the sampling of its pass/fail result. Were there a delay between a final operation of the sensor and the sampling of its pass/fail result, the sensor would consume power even though it does not perform any operation.

Other embodiments and advantages are described in the detailed description below. This summary does not purport to define the inventions. The inventions are defined by the claims.

BRIEF DESCRIPTION OF THE DRAWINGS

The accompanying drawings, where like numerals indicate like components, illustrate embodiments.

DETAILED DESCRIPTION

Reference will now be made in detail to some embodiments of the invention, examples of which are illustrated in the accompanying drawings.

Figure 1:
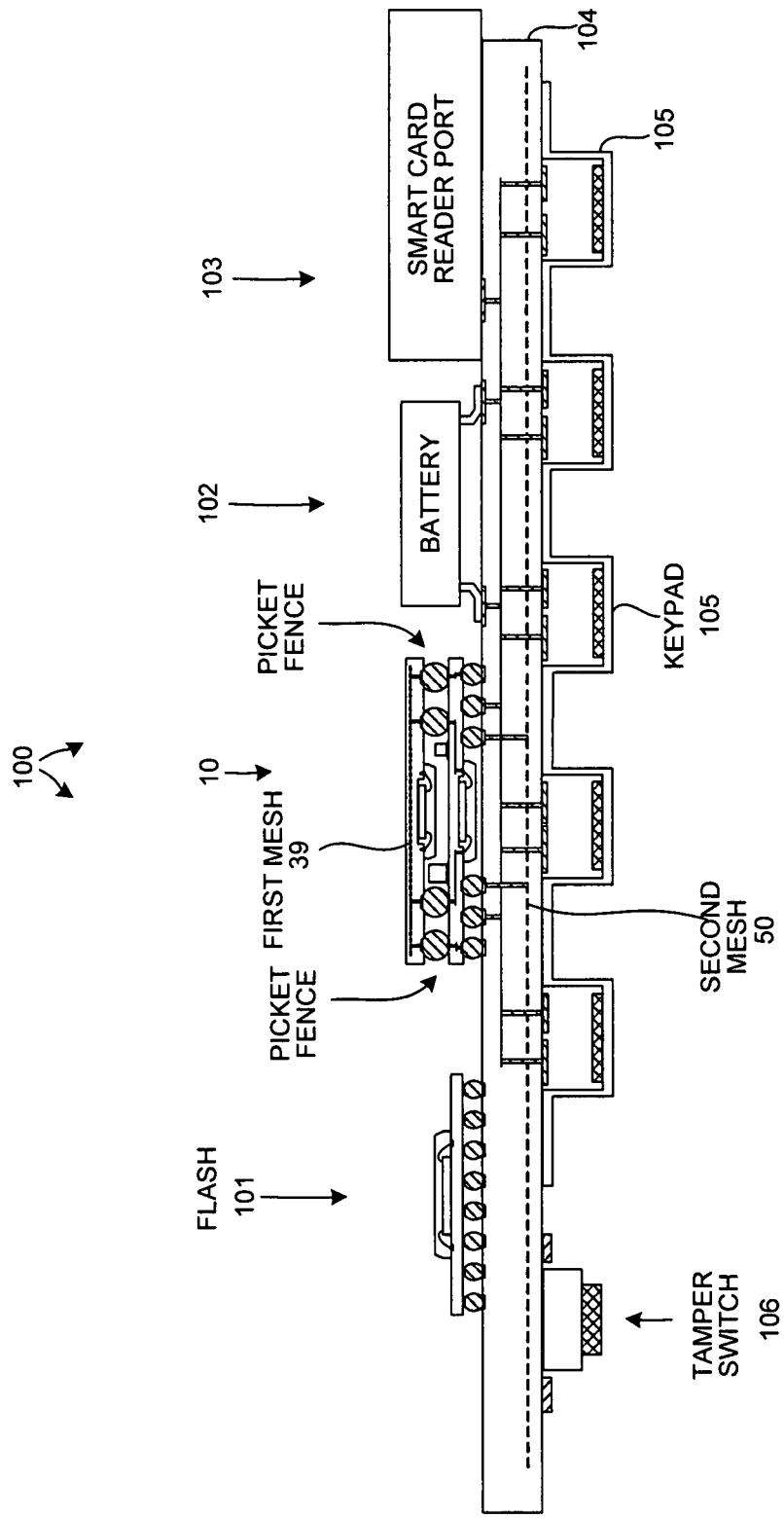
FIG. 1 is a cross-sectional diagram of a portion of a point of sale (POS) terminal that includes a POP secure module.

FIG. 1 is a cross-sectional diagram of a portion of a point of sale (POS) terminal 100 that includes POP secure module 10. For additional details of POP secure module 10, see: U.S. patent application Ser. No. 11/800,175, entitled "PACKAGE-ON-PACKAGE SECURE MODULE HAVING BGA MESH CAP", filed May 3, 2007, inventors Eaton, Staab, and Zeta, which is incorporated herein by reference in its entirety. A plastic enclosure of POS terminal 100 is not illustrated. POP secure module 10, a FLASH memory device 101, a battery 102, and a smart card reader port 103 are surface mounted to a first side of a printed circuit board 104. A flexible keypad 105 and a tamper detect switch 106 are disposed on a second side of the printed circuit board 104 opposite module 10. Each of the keys of keypad 105 has a conductive portion. When the key is pressed, the conductive portion of the key makes contact with and couples together an associated pair of interdigitated contact pads on printed circuit board 104. Integrated circuit die 14 includes key scanning circuitry for detecting which key is pressed.

As illustrated in FIG. 1, the second anti-tamper security mesh 50 is disposed in a metal trace layer within printed circuit board 104. The interdigitated contact pads for the keypad are parts of the bottom metal layer. Second anti-tamper security mesh 50 is located in the next bottom most metal layer so that it is close to keypad 105. Providing mesh 50 close to keypad 105 helps prevent a hacker from gaining access to the backside of the keypad and monitoring key presses.

Figure 2:
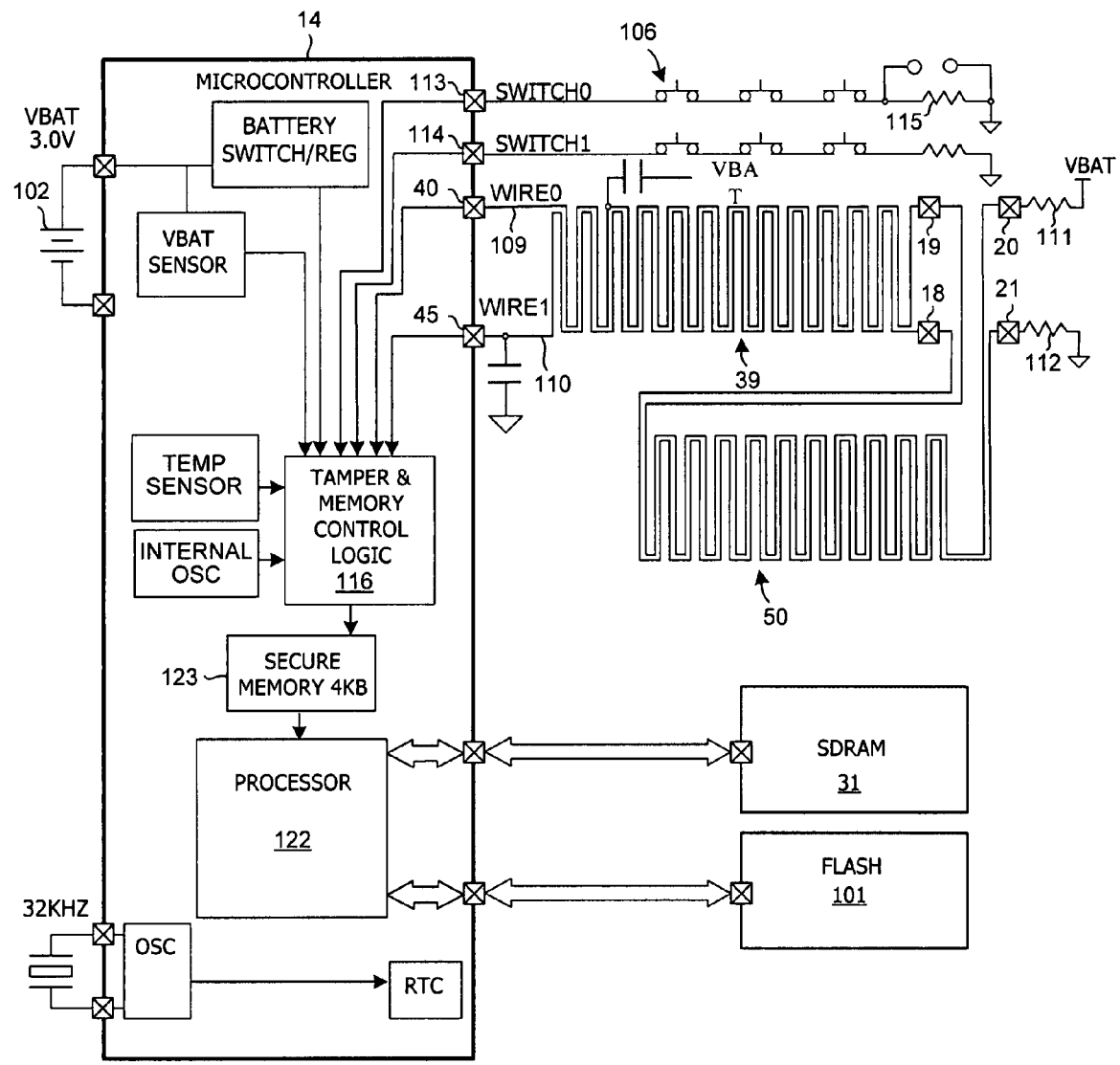
FIG. 2 is a simplified circuit diagram that shows another way that first and second meshes can be connected to an integrated circuit die, in accordance with an embodiment.

FIG. 2 is a simplified circuit diagram that shows another way that first and second meshes 39 and 50 can be connected to integrated circuit die 14, in accordance with an embodiment. In this example, first mesh 39 extends laterally through the substrate member of the second BGA package portion 12 and second mesh 50 extends laterally through printed circuit board 104. Meshes 39 and 50 are, however, driven and monitored from only two terminals of integrated circuit 14. First conductor 109 (WIRE0) extends from terminal 40, through a bond wire, then up through the substrate member of the second BGA package portion, laterally through the substrate member, then back down through a bond ball of the second BGA package portion and to bond ball 19 of the first BGA package portion. From bond ball 19, the conductor continues down into the printed circuit board 104 upon which the secure module 10 is disposed. The conductor extends laterally through the mesh layer of the printed circuit board as a part of second mesh 50, and then extends back up to another bond ball 20 of the first BGA package portion. Band ball 20 is connected through the first BGA package portion to discrete resistor 111. The second conductor 110 (WIRE1) is connected in similar fashion. The second conductor 110 extends from integrated circuit terminal 45, through another bond wire, then up through the substrate member of the second BGA package portion, laterally through the substrate member, then back down through a bond ball of the second BGA package portion and to bond ball 18 of the first BGA package portion. From bond ball 18, the conductor continues down into the printed circuit board 104 upon which the secure module 10 is disposed. The conductor extends laterally through the mesh layer of the printed circuit board as a part of second mesh 50, and then extends back up to another bond ball 21 of the first BGA package portion. Band ball 21 is connected through the first BGA package portion to discrete resistor 112. The first mesh 39 and the second mesh 50 are therefore not driven and monitored separately from one another, but actually form a single larger anti-tamper mesh structure that extends both over and underneath the integrated circuits within the secure module 10. If the secure module 10 is to be used in a configuration without second mesh 50, then bond ball 19 can be coupled directly to bond ball 20 by a short trace on printed circuit board 104 or alternatively by a connection on secure module 10 itself. In the same way, bond ball 18 would be coupled directly to bond ball 21.

In response to unauthorized access to integrated circuit die 14 within POS terminal 100, sensitive information (such as sensitive financial, identification information, and encryption keys) stored within SRAM 31 is overwritten. Unauthorized access to components within POS terminal 100 can be detected using sensors that detect tamper events. In response to detection of one or more tamper event, an alarm is triggered, and a memory that stores sensitive information is overwritten or erased. In one aspect, multiple events detected by a particular sensor occur prior to triggering an alarm to overwrite or erase memory. For example, multiple events arising out of the temperature being too high or too low cause triggering of an alarm.

For example, tamper switches are positioned at various places in the POS terminal such that opening the POS terminal enclosure will cause one of more of these switches to open. For example, the top and bottom portions of the plastic enclosure of the POS terminal together may hold one of these switches in the closed position. If the enclosure is opened, then the top and bottom portions will separate and will no longer hold switch 106 in the closed position. When a switch opens, the voltage on terminal 113 will no longer be pulled to ground potential by resistor 115, but rather the voltage on terminal 113 will be pulled high by a resistor internal to integrated circuit die 14. Tamper control logic 116 uses a switch sensor to determine whether a voltage at terminal 113 is high or ground. This high voltage event is detected by tamper control logic 116.

Tampering with mesh 39 or 50 is detected as an event by tamper control logic 116 using a wire sensor. The wire sensor detects whether the mesh has been tampered with by determining whether an impedance of the mesh has changed. For example, U.S. patent application Ser. No. 11/800,175, entitled "PACKAGE-ON-PACKAGE SECURE MODULE HAVING BGA MESH CAP", filed May 3, 2007, inventors Eaton, Staab, and Zeta, describes suitable techniques for using a mesh to detect unauthorized access to integrated circuit 14. Tamper control logic 116 determines whether a temperature of integrated circuit 14 is too high or too low using a temperature sensor. If the temperature is too high or too low, an event is recorded. In addition, tamper control logic 116 records an event of any of: bias voltage level is too high or too low; the frequency of clock signal used by integrated circuit 14 is too high or too low; or powering up or down the integrated circuit 14.

Figure 3:
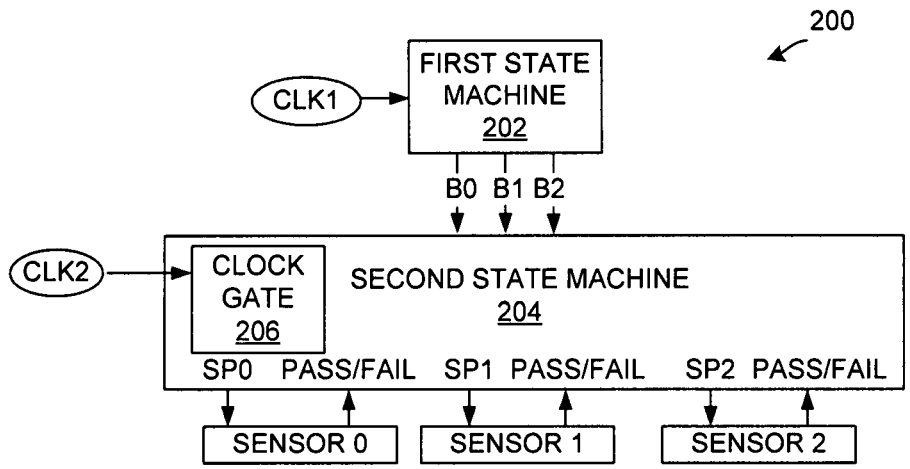
FIG. 3 is a simplified block diagram of a system that controls the power use of sensors and the second state machine, in accordance with an embodiment.

FIG. 3 is a simplified block diagram of a system 200 that controls the power use of sensors and a second state machine, in accordance with an embodiment. In one aspect, tamper and memory control logic 116 of FIG. 2 includes the state machines and sensors of FIG. 3. System 200 controls which sensor consumes power and whether second state machine 204 receives an oscillating clock signal. System 200 includes a first state machine 202, first clock source CLK1, second state machine 204, second clock source CLK2, and sensors 0 to 2. First state machine 202 is implemented as a serial-in, parallel-out shift register with a number of output bits equal to the number of sensors. In this example, there are three sensors, sensors 0 to 2. Accordingly, first state machine 202 outputs three bits B0 to B2. Bits B0 to B2 control which of respective sensors 0 to 2 is activated. When a logic one is in a bit position B0, sensor 0 is activated, when a logic one is in a bit position B1, sensor 1 is activated, and so forth. At each rising edge of clock signal CLK1, first state machine 202 shifts a logic one to position B0 then to position B1 and then to position B2. In one implementation, the clock signal CLK1 is a divided down version of clock signal CLK2 so that clock signal CLK1 is slower than clock signal CLK2.

In response to a sensor being selected for activation, second state machine 204 receives an oscillating clock signal CLK2 and controls the operations of the enabled sensor timed according to the second clock signal CLK2. In one aspect, each sensor operation can be designed so that it takes as few a number of cycles of clock signal CLK2 to complete as possible so that power consumption is minimized. When second state machine 204 is in a wait state for a next sensor and first state machine 202 has not selected the next sensor for activation, second state machine 204 receives a clock signal CLK2 held at a fixed value. Clock gate 206 controls whether the received clock signal CLK2 is an oscillating clock signal or is held at a fixed value of logic one. A suitable implementation of clock gate 206 is shown in FIG. 4.

Figure 4:
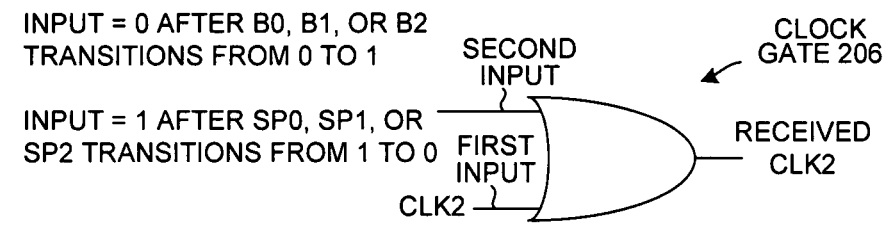
FIG. 4 depicts an embodiment of a clock gate of FIG. 3, in accordance with an embodiment.

FIG. 4 depicts an embodiment of a clock gate of FIG. 3, in accordance with an embodiment. In this example, clock gate is implemented as an OR gate having a first input of clock signal CLK2 and a second input of logic zero or logic one. The logic value of the second input is set to logic zero after B0, B1, or B2 transitions from logic zero to logic one and the logic value of the second input is set to logic one after SP0, SP1, or SP2 transitions from logic one to logic zero. When second input is logic zero, the received clock signal CLK2 is the same as clock signal CLK2. When second input is logic one, the received clock signal CLK2 is held at logic one. The output from clock gate 206 is referred to as the received clock signal CLK2.

Figure 5:
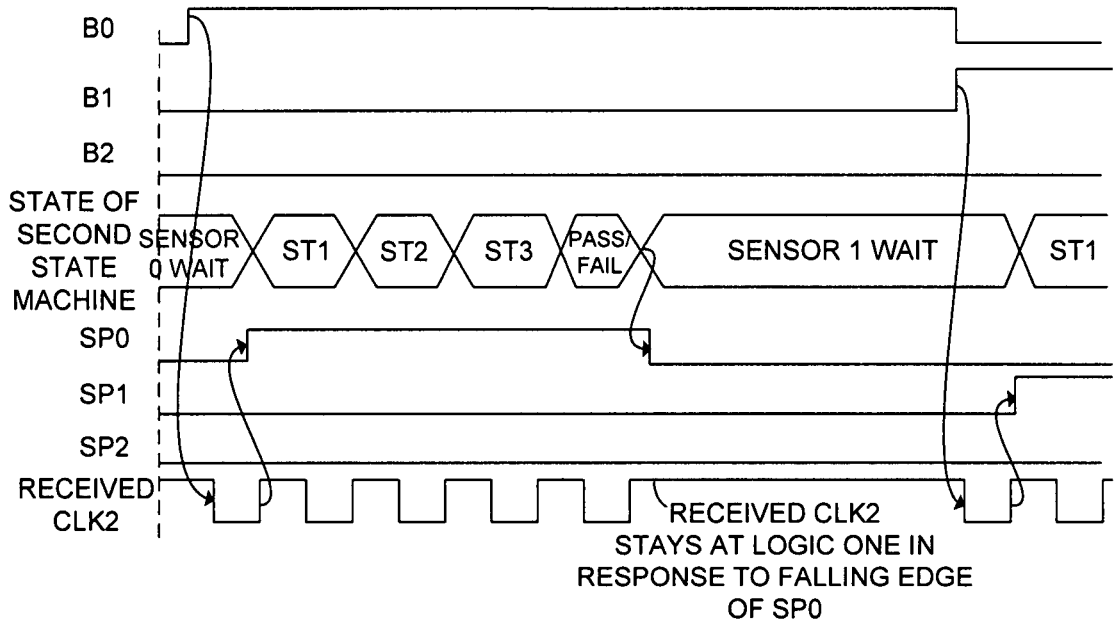
FIG. 5 depicts a waveform diagram of signals generated by the system of FIG. 3, in accordance with an embodiment.

FIG. 5 depicts a waveform diagram of signals generated by system 200 of FIG. 3, in accordance with an embodiment. Prior to signal B0 changing to a logic one, second state machine 204 is in a sensor 0 wait state. During the sensor 0 wait state, second state machine 204 waits for activation of sensor 0 so that immediately after activation of sensor 0, second state machine 204 controls operations of sensor 0. In addition, prior to signal B0 changing to a logic one, the state of received clock signal CLK2 is held at a logic one value so that second state machine 204 does not consume power caused by receiving an oscillating clock signal. When second state machine 204 receives an oscillating clock signal, current is consumed in part by second state machine 204 from the battery source due in part to capacity loading and turning on N and P channels. A rising edge at signal B0 causes received clock signal CLK2 to toggle to logic zero and then toggle high and low in the same manner as clock signal CLK2.

The next rising edge of received clock signal CLK2 causes second state machine 204 to output a sensor power signal SP0 for sensor 0 in a logic one state. Second state machine 204 is in a power down wait state until sensor power signal SP0 changes to the logic one state. After sensor power signal SP0 transitions to a logic one state, second state machine 204 controls sensor 0 to perform a first operation for sensor 0, namely ST1. Second state machine 204 controls operations ST1-ST3 performed by sensor 0 timed according to clock signal CLK2 so that each of operations ST1-ST3 can take one or more clock cycles of clock signal CLK2. When sensor 0 is a wire sensor, operations performed that involve consuming power during ST1 to ST3 include powering-on a comparator component (e.g., voltage or current). When sensor 0 is a switch sensor or a temperature sensor, operations performed that involve consuming power during ST1 to ST3 include powering-on a comparator component (e.g., voltage or current) and then powering-on a current source component.

Immediately after completion of operation ST3, second state machine 204 samples the pass/fail indication from sensor 0. A pass indication indicates that the sensor has not detected tampering with the sensed item (e.g., switch, wire, or temperature) based on measurements taken using the powered-on components. A fail indication indicates that the sensor has detected tampering with the sensed item (e.g., switch, wire, or temperature) based on measurements taken using the powered-on components. Completion of sampling the pass/fail state from sensor 0 causes second state machine 204 to change signal SP0 for sensor 0 to logic zero. After completion of sampling of pass/fail output from sensor 0, second state machine 204 enters a wait state for a next sensor, sensor 1. The next step performed by second state machine after the wait state for sensor 1 is operation ST1 for sensor 1. The change of signal SP0 to logic zero causes the output from clock gate 206 of the received clock signal CLK2 to be held at a logic one state.

When the sensor power signal SP0 for sensor 0 falls to logic zero, components of sensor 0 cease to consume power. For example, when sensor 0 is a wire sensor, the comparator of the wire sensor stops consuming power. For example, when sensor 0 is a switch sensor, the comparator and current source of the switch sensor stop consuming power. For example, when sensor 0 is a temperature sensor, the comparator and current source of the temperature sensor stop consuming power. When the state of received clock signal CLK2 is held at a logic one value, second state machine 204 does not consume power from receiving an oscillating clock signal.

Subsequently, when signal B1 transitions to logic one, clock gate 206 allows received clock signal CLK2 to match clock signal CLK2. The next rising edge of received clock signal CLK2 causes second state machine 204 to change sensor power signal SP1 for sensor 1 to a logic one state. Signal sensor power SP1 for sensor 1 transitioning to a logic one state causes sensor 1 to power on the component used during sensing operation ST1. Sensor 1 can be a wire, switch, or temperature sensor but is not the same as sensor 0.

By contrast, some known systems have a gap in time between when the sensor completes performing all operations and a time of sampling of pass/fail despite not performing any operation during that gap in time. Accordingly, the systems consume power during the gap even though no operation is performed because the selected sensor consumes power during the gap and second state machine consumes power during the gap because it receives an oscillating clock signal. System 200 controls operations of a sensor to be sequential with no gap between when the sensor completes performing all operations and a time of sampling of a pass/fail indication. For example, with reference to the example of FIG. 5, there is no gap between operation ST3 and the sampling of pass/fail state for sensor 0. Accordingly, there is potentially no power consumption between when a last operation takes place and a sample pass/fail state.

Some known systems have state machines that control operations of the sensors and the state machines receive oscillating clock signals even when no sensor is operating. Accordingly, such systems consume power from receiving an oscillating clock signal when the system does not control any sensor. By contrast, system 200 fixes a clock signal to a value when second state machine 204 is in a wait state for a next sensor and first state machine 202 has not selected the next sensor and avoids power consumption arising out of receiving an oscillating clock signal.

Some known systems employ asynchronous control logic that uses short "one shot" pulses and analog delays to control whether a sensor is on or off and to sample the output from a sensor. However, such asynchronous systems do not synthesize well using register transfer level (RTL). By contrast, system 200 operates synchronously by using clock signals CLK1 and CLK2 and the frequency of clock signal CLK1 is a multiple of that of clock signal CLK2.

Figure 6:
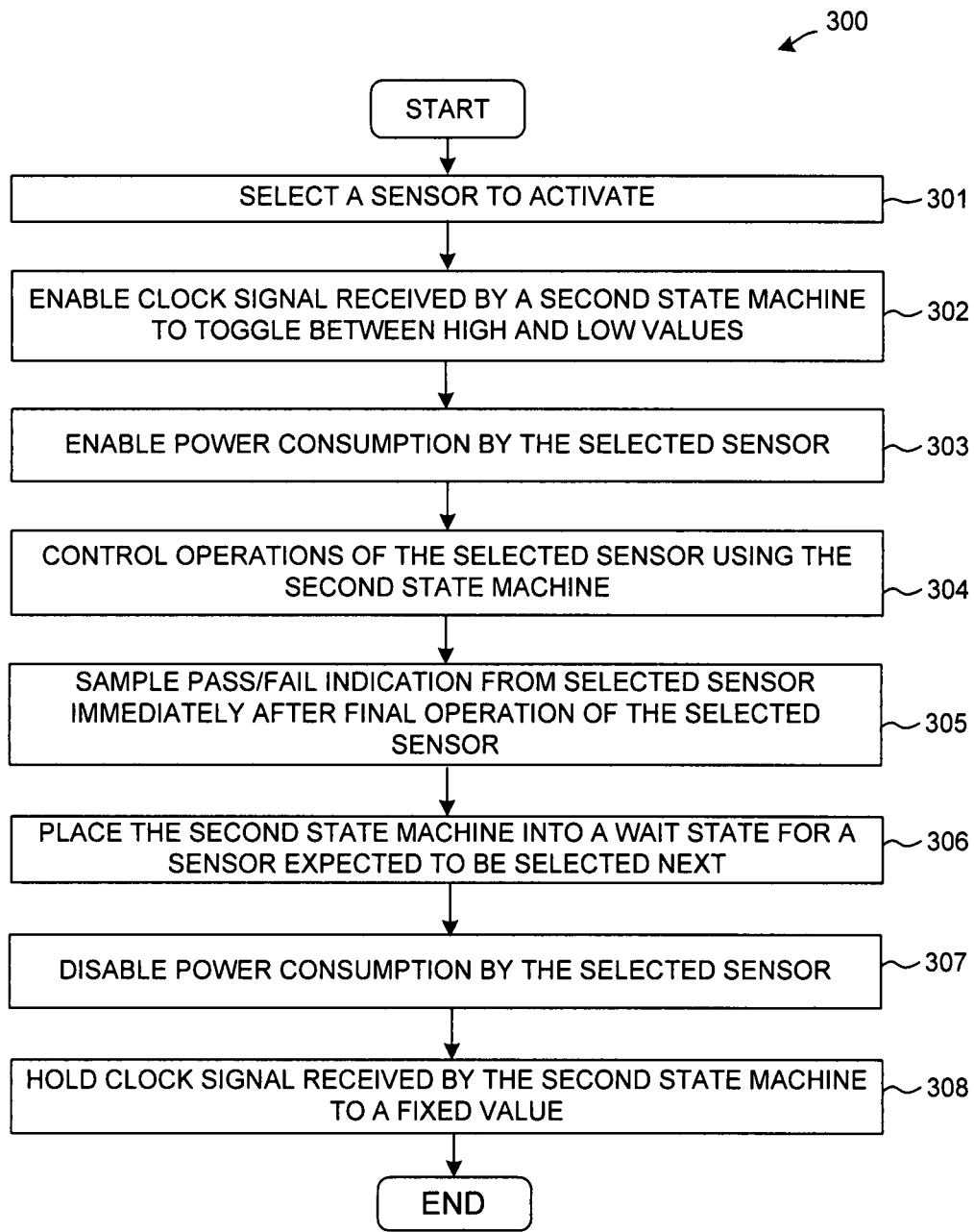
FIG. 6 depicts a flow diagram of a process that controls power use of sensors, in accordance with an embodiment.

FIG. 6 depicts a flow diagram of a process 300 to control power use of sensors, in accordance with an embodiment. In action 301, a sensor is selected for activation. Referring to FIG. 5, first state machine 202 outputs a logic one on one of bits B0 to B2 to select a sensor for activation. In action 302, a clock signal received by the second state machine is enabled to toggle between high and low values. Referring to FIG. 5, a second input to clock gate 206 transitions to logic zero after a sensor is selected for activation and thereafter matches clock signal CLK2. In action 303, the selected sensor is permitted to consume power. For example, referring to FIG. 5, a rising edge of toggling received clock signal CLK2 causes a power consumption signal SP0 to transition to logic one to enable sensor 0. For example, sensor components such as a comparator or current source are enabled to consume power. In action 304, the second state machine controls the operations of the selected sensor. In action 305, immediately after completion of a final operation of the selected sensor, the second state machine samples the pass/fail indication from the selected sensor. Action 305 removes any gap between completion of a final operation and sampling of the pass/fail indication. Were there a gap between completion of a final operation of the selected sensor and sampling the pass/fail indication, even though no sensor operation takes place, the selected sensor consumes power during the gap and second state machine consumes power during the gap because it receives an oscillating clock signal. In action 306, the second machine is placed into a wait state for a sensor expected to be selected next. With reference to FIG. 5, the sensor expected to be selected after sensor 0 is sensor 1. In action 307, power consumption by the selected sensor is disabled. Sensor components such as a comparator and a current source are disabled and not allowed to consume power. In action 308, the clock signal received by the second state machine is held to a fixed value. In response to action 308, second state machine does not consume power caused by receipt of an oscillating clock signal when the clock signal is held to a fixed value.

The Compact Disc appendix contains Verilog source code of another embodiment. For example, the file SampleCode.txt is an implementation of another embodiment of system of FIG. 3.

Although some embodiments have been described in connection with certain specific embodiments for instructional purposes, the present invention is not limited thereto. For example, clock signal CLK2 can be held to a fixed value of logic zero. For example, clock signal CLK2 can be held to a fixed value prior to sampling the pass/fail such as immediately after the completion of state ST3 in FIG. 5. Rather than implement first state machine as a shifter, first state machine can be a clock signal and second state machine activates a different sensor at each rising edge of the clock signal. Second state machine 204 can disable power consumption of any component when the component is not used, even prior to completion of a final operation of the sensor and even prior to a sampling pass/fail condition from the sensor. For example, a current source can be powered off prior to final operation of the sensor or prior to a sampling pass/fail condition from the sensor. Accordingly, various modifications, adaptations, and combinations of various features of the described embodiments can be practiced without departing from the scope of the invention as set forth in the claims.

What is claimed is:

1. A method comprising:
permitting a clock signal to toggle in response to selection of a first sensor, wherein the first sensor is coupled to receive the clock signal, and operation of the first sensor relies on and is controlled by the clock signal;
enabling power consumption by the first sensor;
controlling an operation of the first sensor based on the clock signal;
sampling a pass/fail result from the first sensor, wherein the sampling occurs immediately after completion of the operation;
disabling power consumption by the first sensor; and
holding the clock signal to a fixed value after the sampling.

2. The method of claim 1, wherein the selection of the first sensor is timed according to a second clock signal that is a divided down version of the clock signal.

3. The method of claim 1, wherein the first sensor determines an occurrence of an event selected from a group consisting of: removal of a covering of a point of sale terminal, change of an impedance of a mesh surrounding an integrated circuit, change in system clock frequency, change in temperature, change in bias voltage level, and powering up or down an integrated circuit.

4. The method of claim 1, further comprising:
erasing contents of a memory in response to a fail result.

5. The method of claim 1, wherein enabling power consumption by the first sensor comprises enabling power consumption of a component selected from a group consisting of: a comparator and a current source.

6. The method of claim 1, wherein disabling power consumption by the first sensor comprises disabling power consumption of a component selected from a group consisting of: a comparator and a current source.

7. The method of claim 1, wherein the disabling power consumption by the first sensor comprises disabling power consumption by the first sensor in response to sampling of the pass/fail result.

8. The method of claim 1, further comprising:
entering a wait state for a second sensor.

9. The method of claim 8, further comprising:
permitting the clock signal to toggle in response to selection of the second sensor;
enabling power consumption by the second sensor;
controlling an operation of the second sensor based on the clock signal;
sampling a pass/fail result from the second sensor;
disabling power consumption by the second sensor; and
holding the clock signal to the fixed value after the sampling a pass/fail result from the second sensor.

10. A point of sale (POS) terminal comprising:
a battery;
a clock source that outputs a clock signal;
a memory device that stores information; and
tamper and memory control logic that detects a potential tampering with the POS terminal and issues a clear request signal to the memory device to overwrite the memory, wherein the tamper and memory control logic comprises:
at least one sensor that is coupled to receive the clock signal, and operation of the at least one sensor relies on and is controlled by the clock signal,
a first state machine that selects a sensor, and
a second state machine that includes a clock gate that controls whether the second state machine consumes power from receiving the clock signal.

11. The POS terminal of claim 10, wherein the second state machine controls operations of the selected sensor timed according to the clock signal.

12. The POS terminal of claim 10, wherein the second state machine allows the selected sensor to consume power.

13. The POS terminal of claim 10, wherein the selected sensor consumes power using a component selected from a group consisting of: a comparator and a sensor.

14. The POS terminal of claim 10, wherein the at least one sensor is selected from a group consisting of: a temperature sensor, a switch sensor, and a wire sensor.

15. The POS terminal of claim 10, wherein the second state machine samples a pass/fail indication from the selected sensor immediately after completion of operations of the selected sensor.

16. The POS terminal of claim 10, wherein in response to receiving one or more fail indications from the selected sensor, the second state machine issues an alarm that causes a portion of the memory device to be overwritten.

17. The POS terminal of claim 16, wherein the memory device overwrites information selected from a group consisting of: financial information, personal identification information, and encryption keys.

18. An apparatus comprising:
at least one sensor;
a first state machine that selects a sensor to operate; and
means for controlling power consumption of the apparatus, the means comprising:
a second state machine that controls when the sensor consumes power and operations of the selected sensor, wherein the second state machine includes a clock gate that controls whether the second state machine consumes power from receiving a clock signal, and wherein the first sensor is coupled to receive the clock signal, and operation of the first sensor relies on and is controlled by the clock signal.

19. The apparatus of claim 18, wherein the clock gate allows the second state machine to receive the clock signal when a next sensor is selected.

20. The apparatus of claim 18, wherein the clock gate controls the second state machine to receive a fixed value instead of the clock signal when the second state machine is in a wait state for a next sensor and the next sensor is not selected.

21. The apparatus of claim 18, wherein the second state machine samples a pass/fail indication from the selected sensor immediately after completion of the operations of the selected sensor.

22. The apparatus of claim 21, wherein the second state machine disables power consumption of the selected sensor immediately after sampling the pass/fail indication.

23. The apparatus of claim 22, wherein the second state machine enters a wait state for a sensor to be selected next immediately after the sampling the pass/fail indication.

* * * * *